(12) United States Patent
Kingdon et al.

(10) Patent No.: US 9,225,914 B2
(45) Date of Patent: Dec. 29, 2015

(54) INFRARED IMAGING SYSTEM

(71) Applicant: RAYTHEON COMPANY, Waltham, MA (US)

(72) Inventors: Frederic W. Kingdon, Fairview, TX (US); Michael G. Foley, Van Alstyne, TX (US); Michael D. Ernest, Garland, TX (US); George T. Strother, McKinney, TX (US); David J. Markason, Tucson, AZ (US); Richard C. Juergens, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 569 days.

(21) Appl. No.: 13/712,276

(22) Filed: Dec. 12, 2012

(65) Prior Publication Data

US 2014/0002665 A1   Jan. 2, 2014

Related U.S. Application Data

(60) Provisional application No. 61/666,239, filed on Jun. 29, 2012.

(51) Int. Cl.
| | |
|---|---|
| H04N 5/33 | (2006.01) |
| G02B 13/14 | (2006.01) |
| G02B 23/12 | (2006.01) |
| H04N 5/225 | (2006.01) |
| G01S 17/02 | (2006.01) |
| G01S 7/481 | (2006.01) |
| G01S 7/497 | (2006.01) |

(52) U.S. Cl.
CPC *H04N 5/33* (2013.01); *G01S 7/481* (2013.01); *G01S 17/026* (2013.01); *G02B 13/146* (2013.01); *G02B 23/12* (2013.01); *H04N 5/2251* (2013.01); *G01S 7/497* (2013.01)

(58) Field of Classification Search
None
See application file for complete search history.

(56) References Cited

U.S. PATENT DOCUMENTS

| | | |
|---|---|---|
| 5,477,395 A | 12/1995 | Cook |
| 5,510,618 A | 4/1996 | Blecha et al. |
| 5,936,771 A | 8/1999 | Cooper |
| 6,274,868 B1 | 8/2001 | Hall et al. |
| 6,310,345 B1 | 10/2001 | Pittman et al. |
| 2004/0075812 A1* | 4/2004 | Kardon et al. ............... 351/206 |
| 2007/0086087 A1* | 4/2007 | Dent et al. ................... 359/399 |

OTHER PUBLICATIONS

"Argos 410-Z Airborne Surveillance System," <https://web.archive.org/web/20081204125123/http://www.zeiss.de/C12571300034F59C/0/4C9A0C93945F9D47C12573A10035F67D/$file/53_0891e_argoes.pdf>, retrieved from the Internet on Jan. 14, 2014, dated Dec. 4, 2008.

Gray, Peter, "System Evaluation—Eagle Eyes: A New Targeting System is Aimed at Giving Helicopter Pilots the Edge During the Heat of Combat," Flight Global, Mar. 20, 2001.

* cited by examiner

*Primary Examiner* — William C Vaughn, Jr.
*Assistant Examiner* — Eileen Adams
(74) *Attorney, Agent, or Firm* — Lando & Anastasi, LLP

(57) ABSTRACT

An infrared imaging sensor compatible with $2^{nd}$ Generation Forward Looking Infrared (FLIR) Horizontal Technology Integration (HTI) B-Kit based sensors. In one example, the infrared imaging sensor includes a set of refractive optomechanical modules, including an afocal optical module, a receiver assembly, and backward- and forward-compatible electronics modules. The afocal optical module is configured to provide a plurality of different fields of view for the infrared imaging sensor. In one example, the sensor is configured for MWIR and LWIR imagery.

21 Claims, 15 Drawing Sheets

INFRARED IMAGING SYSTEM

CROSS REFERENCE TO RELATED APPLICATIONS

This application claims the benefit under 35 U.S.C. §119 (e) of U.S. Provisional application No. 61/666,239, filed on Jun. 29, 2012 and titled "INFRARED IMAGING SYSTEM," which is herein incorporated by reference in its entirety.

BACKGROUND

Forward Looking Infrared (FLIR) imaging systems are used in many applications by many organizations, including the U.S. Army. A common module approach has been adopted for the production and fielding of FLIR systems to allow common access to core FLIR components in order to reduce costs and facilitate maintenance, while maintaining flexibility in the sensor configuration and a common look and feel between sensors. The Army uses FLIR kits (that include one or more FLIR modules) in the majority of ground combat vehicle platform sensors. For example, weapon sights that are based on FLIR technology support battlefield surveillance and target acquisition. They allow gunners and field commanders to detect, identify and target enemy platforms even for conditions of low visibility, for example, at night and/or when there are obscurants such as smoke, fog and dust in the air. Currently US Army ground combat vehicles use Second Generation FLIR horizontal technology integration (HTI) modules to provide infrared (IR) imagery. U.S. Pat. No. 5,510,618 describes examples of Second Generation FLIR HTI B-kits.

SUMMARY OF INVENTION

Some conventional FLIR kits do not provide the ability to detect, recognize or identify threats at very long range, for example, at ranges that exceed the threat engagement range or maximum munitions range. In addition, the sensor field of view may be narrower than may be desired to support short acquisition times. Attempts to upgrade FLIR modules for improved performance with advances in technology have included replacing the entire sensor system (which is expensive), and upgrading with small pixel longwave infrared (LWIR) sensors which, although providing better performance than the sensors used in some older systems, still do not provide the highest levels of performance, due to limitations of a single spectral band in a space constrained installation.

Certain embodiments are directed to an infrared imaging sensor that supports upgrades to $2^{nd}$ Generation Forward Looking Infrared (FLIR) Horizontal Technology Integration (HTI) B-Kit based sensors by fitting with space available within applicable A-Kits and providing significantly improved detection, recognition, and identification range.

Aspects and embodiments are directed to a FLIR B-kit that includes a set of refractive opto-mechanical modules and backward-compatible electronics modules which may be used to upgrade existing Second Generation FLIR HTI B-kit based sensor systems to provide greatly extended identification range and/or an ultrawide field of view (FOV). Electronics modules can also be used to sustain Second Generation FLIR HTI sensors. Embodiments of the FLIR B-kits are configured to fit within the footprint of existing Second Generation FLIR HTI B-kit modules, thereby providing an effective retrofit option for sensor systems.

According to one embodiment, an infrared imaging sensor compatible with second generation forward looking infrared (FLIR) B-kits, comprises a set of refractive opto-mechanical modules configured to receive and focus infrared electromagnetic radiation in at least the mid-wave infrared (MWIR) and long-wave infrared (LWIR) spectral bands, the set of refractive opto-mechanical modules including an afocal optical module configured to provide a plurality of fields of view for the infrared imaging sensor, and a focus cell configured to focus the infrared electromagnetic radiation, a receiver assembly including a detector in a Dewar optically coupled to the focus cell and configured to receive the infrared electromagnetic radiation from the focus cell and to generate an image from the infrared electromagnetic radiation, and at least one electronics module configured to provide an electronic interface for the infrared imaging sensor, and to process the image.

In one example the afocal optical module is configured to provide at least four fields of view. In one example the at least four fields of view include an ultranarrow field of view, a narrow field of view, a wide field of view, and an ultrawide field of view. In another example the at least four fields of view includes five fields of view, further including a medium field of view. In this example, the receiver assembly may include a FOV mechanism configured to switch the field of view of the sensor between the ultranarrow field of view and the narrow field of view. In another example the at least four fields of view include an ultranarrow field of view, a narrow field of view, a medium field of view, and a wide field of view. The afocal optical module may be configured to receive and magnify the electromagnetic radiation in the MWIR and LWIR spectral bands and to output magnified electromagnetic radiation via the focus cell. In one example the afocal optical module comprises a plurality of field of view (FOV) cells, each configured to provide one of the plurality of fields of view, the plurality of FOV cells being disposed on a rotating structure that is configured to rotate with respect to the focus cell so as to align one of the plurality of FOV cells with the focus cell. The afocal optical module may further include a thermal reference source disposed on the rotating structure. The afocal optical module may further comprise a movable lens that is movable into and out of an optical path between an input aperture of the afocal optical module and at least one of the plurality of FOV cells. In one example the focus cell is an eyepiece for the afocal optical module. In another example the Dewar includes a dual f/# variable aperture mechanism configured to provide a first f/# for at least a first one of the plurality of fields of view, and a second f/# for at least a second one of the plurality of fields of view. The receiver assembly may further include an imager configured to direct the infrared electromagnetic radiation from the focus cell to the detector in the Dewar. The receiver assembly may further include an image motion compensation mirror. In one example the image motion compensation mirror is configured for back-scan imaging. The detector may be a two-dimensional focal plane array, for example.

According to another embodiment, an infrared imaging sensor comprises an afocal optical assembly including an input aperture configured to receive infrared electromagnetic radiation from a distant object, a focus cell, a plurality of field of view (FOV) cells disposed on a rotating structure configured to rotate with respect to the focus cell so as to align one of the plurality of FOV cells with the focus cell, wherein each of the FOV cells has a different field of view, a receiver assembly including a detector optically coupled to the focus cell and configured to receive the infrared electromagnetic radiation from the focus cell and to provide an image of the distant object, and at least one electronics module configured to interface the infrared imaging sensor with other sensor modules and to process the image of the distant object.

In one example the plurality of FOV cells includes an ultranarrow FOV cell, a wide FOV cell, and an ultrawide FOV cell. The afocal optical assembly may further include a movable lens configured to be movable into and out of an optical path between the input aperture and at least one of the FOV cells. In another example the plurality of FOV cells includes a medium FOV cell, a wide FOV cell, and optionally an ultrawide FOV cell, and the receiver assembly further includes a FOV mechanism configured to switch the field of view of the sensor between an ultranarrow field of view and a narrow field of view. In one example, the infrared electromagnetic radiation includes mid-wave infrared radiation in a wavelength range of approximately 3 to 5 micrometers and long-wave infrared radiation in a wavelength range of approximately 8 to 12 micrometers.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to a FLIR B-kit, optionally referred to as a Third Generation FLIR B-kit, which can be used to upgrade sensor systems that use existing Second Generation FLIR HTI B-kit modules. In one embodiment, the FLIR B-kit includes a set of infrared (IR) sensor modules, including one or more refractive opto-mechanical modules and electronics modules. The electronics modules may include electronic circuit card assemblies that are backward compatible with legacy Second Generation FLIR B-kits and forward compatible with Third Generation FLIR B-kits. Backward compatibility provides obsolescence mitigation to Second Generation FLIR HTI modules, and forward compatibility allows Third Generation FLIR B-kits to reuse the electronics modules while upgrading Second Generation FLIR B-kits with new features. Embodiments of the FLIR B-kit, in addition to matching field of view of the existing Second Generation FLIR HTI B-Kit, provide a field of view that provides improved sensor resolution, allowing sensor systems to achieve far greater range performance (in some examples, under good conditions, more than doubling the acquisition range compared to legacy Second Generation FLIR B-kit based sensor systems), and may provide a wider field of view, as discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1A:
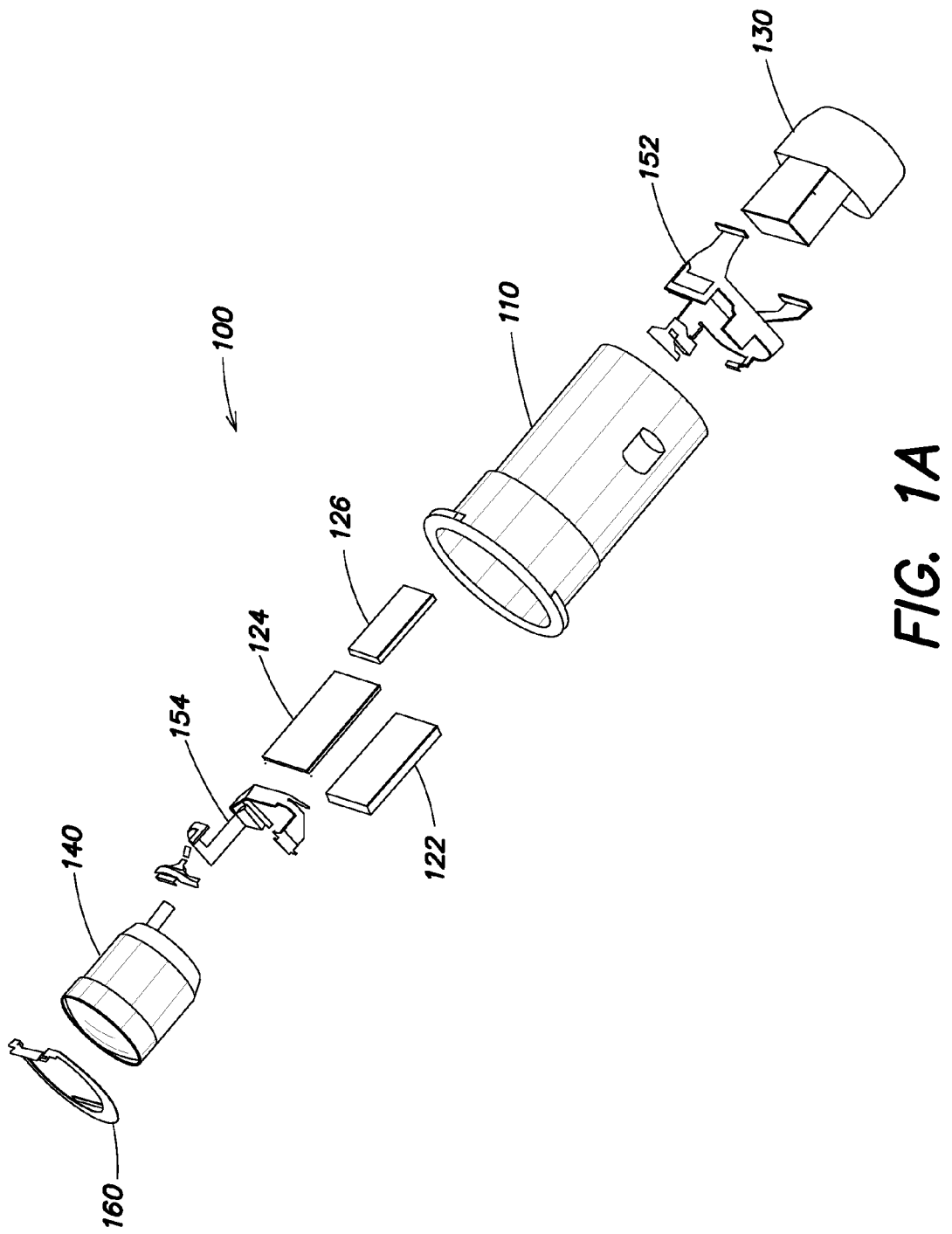
FIG. 1A is an exploded view of one example of a sight assembly including modules of a FLIR B-kit according to aspects of the invention.

Referring to FIG. 1A there is illustrated an exploded diagram of one example of a sight assembly including modules of an FLIR B-kit according to one embodiment. The sight assembly 100 includes a sight chassis 110 that houses circuit card assemblies 122, 124 and optionally 126, a receiver assembly 130, and an afocal optical assembly 140. The receiver assembly 130 and afocal optical assembly 140 are mounted within the chassis 110 and coupled to other components via flexible circuit assemblies 152, 154, respectively. The sight assembly 100 may further include an electromagnetic interference shield assembly 160. In one example, the circuit card assembly 122 is a mechanism control circuit card assembly, and the circuit card assemblies 124, 126 are digital processing circuit cards, as discussed further below.

Figure 1B:
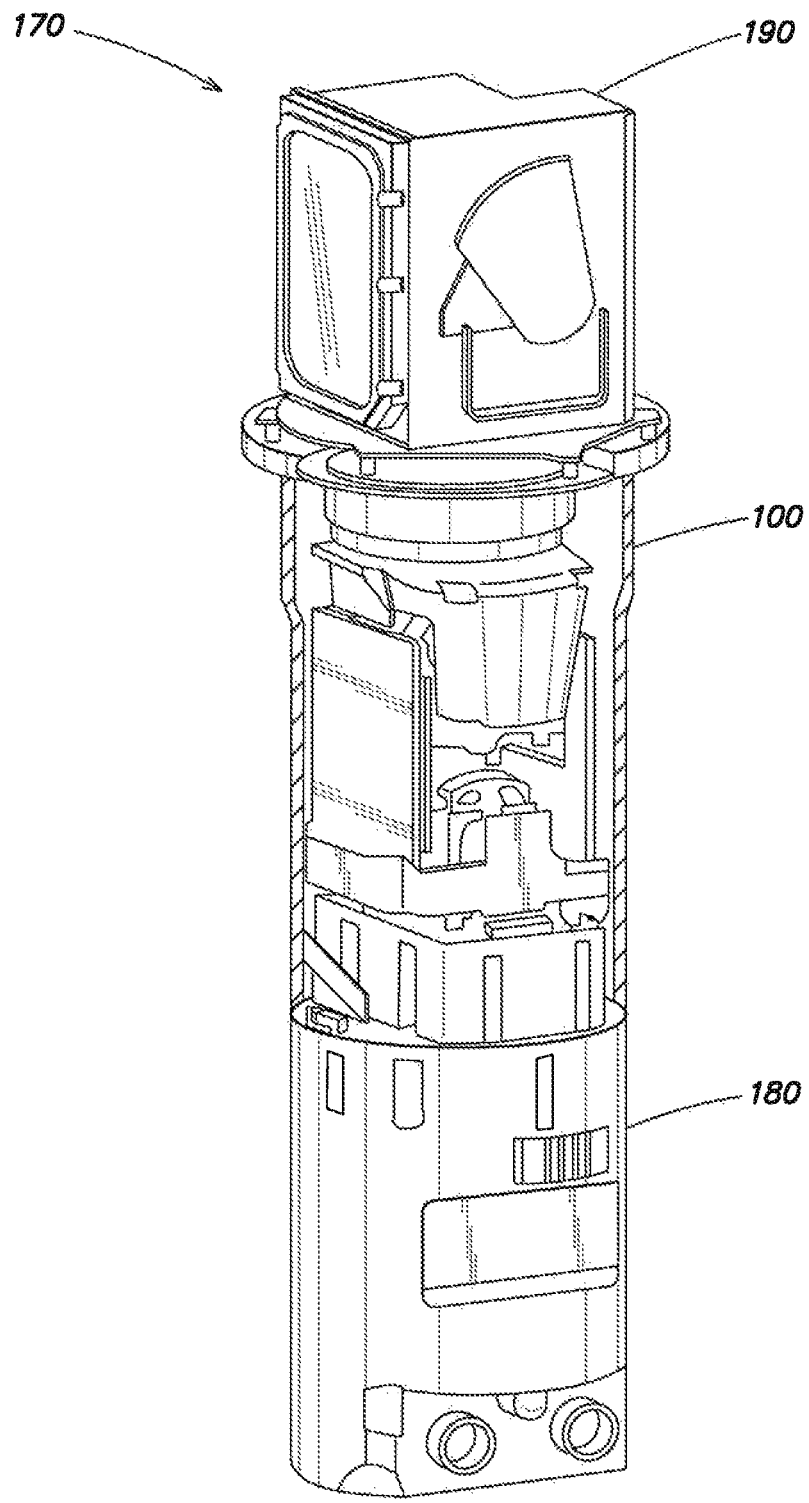
FIG. 1B is an assembled view of one example of the sight assembly of FIG. 1A, according to aspects of the invention.

FIG. 1B illustrates an example of an assembled system 170 including element 100 (shown assembled), to include the components shown in FIG. 1A. The sight 170 further includes a slip ring assembly 180 and a head mirror assembly 190.

According to certain examples, elements 122, 124, 126, 130, and 140 make up a B-Kit which may be common between multiple sensor systems; and elements 160, 154, 110, and 152 are components which may be included in an "A-Kit" that may be unique to different sensor systems. In some embodiments the B-Kit common components are configured to fit within the space allocated in existing systems for conventional Second Generation FLIR B-Kit modules, such that they may be used as retrofit components. Thus, for example, the overall dimensions of the assembled sight 170 may be comparable to those of sight assemblies incorporating Second Generation FLIR B-kits, such that these sight assemblies may be easily accommodated as a replacement part within existing systems.

Figure 5A:
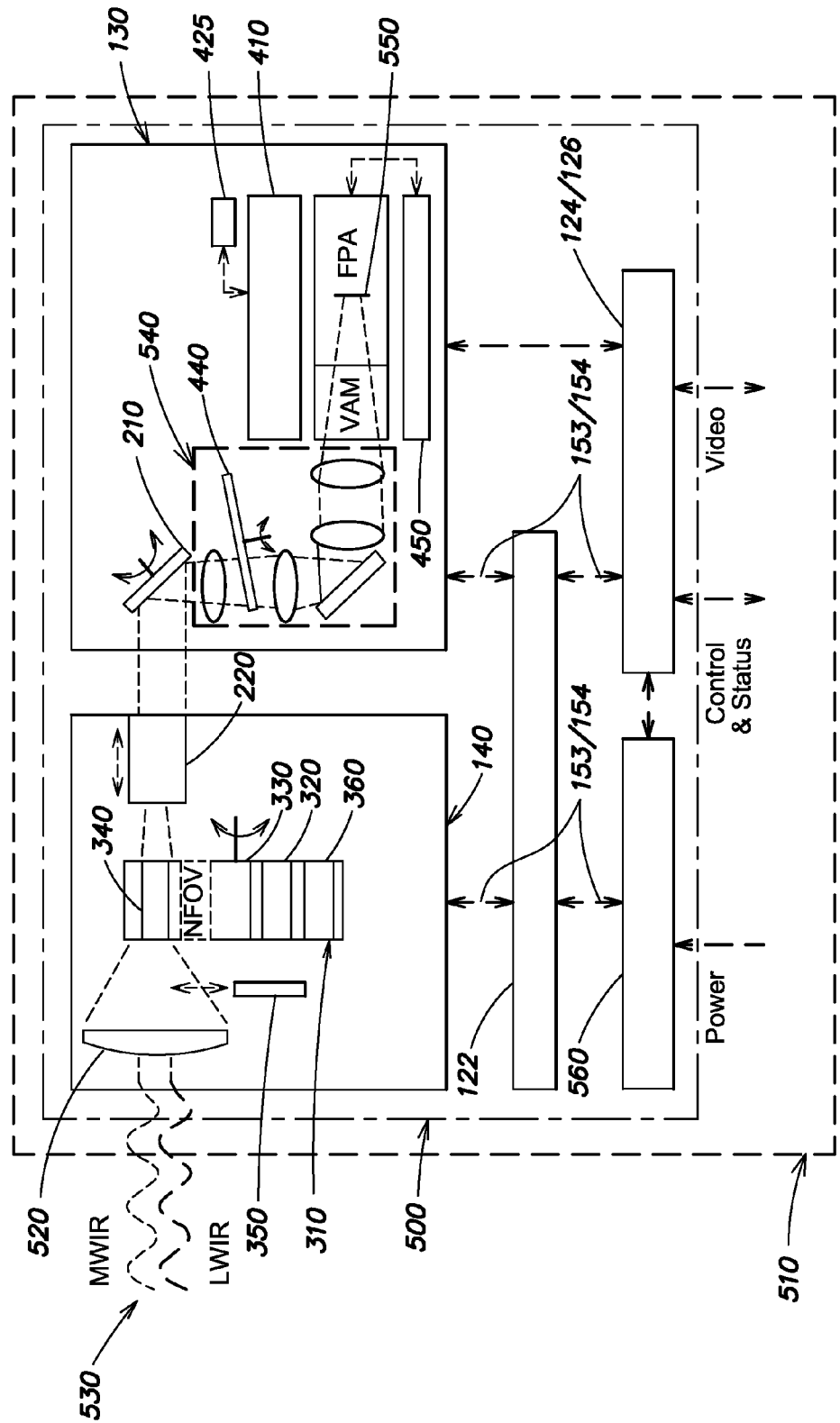
FIG. 5A is a block diagram of one example of an optical system according to aspects of the invention.

FIG. 5A is a block diagram of one example of an optical system showing an example of the relationship between a B-Kit 500 and an A-Kit 510. The A-kit may include various structure and components used to install and operate the optical system, including, for example, gimbals (for mounting the system to a vehicle or other platform), line-of-sight controls and gyroscopes, interconnects to other systems, and user interfaces (such as controls and displays). For example, in operation of the optical system, jitter (such as may occur due to movement of the sight as it is used) can blur the image obtained. Accordingly, in one embodiment, the head mirror assembly 190 or A-kit 510 includes a gyroscope configured to help improve image stabilization as discussed further below.

According to one embodiment, the afocal optical assembly 140 includes an objective lens 520 that receives incident electromagnetic radiation 530 and directs it into the afocal optical assembly. In one embodiment, the afocal optical assembly has a plurality of selectable fields of view implemented using a plurality of field-of-view (FOV) cells mounted on a rotary turret 310 that allows a user to select between fields of view, as discussed further below. The electromagnetic radiation is directed via a selected one of the FOV cells to a focus cell 220, which directs the electromagnetic radiation to the receiver assembly 130. Embodiments of the afocal optical assembly 140 are discussed in more detail below with reference to FIGS. 3A-3F. The receiver assembly 130 includes an optical imager 540 which may include a plurality of lenses and/or mirrors configured to receive and focus the incoming electromagnetic radiation 530 from the focus cell 220 onto a detector 550. The detector may be a focal plane array, or other imaging detector. In one embodiment, particularly for infrared imaging applications, the detector 550 is housed within a Dewar 230 which may be cooled by a cryogenic cooler 410. The receiver assembly 130 is discussed further below with reference to FIGS. 4A and 4B.

Figure 2:
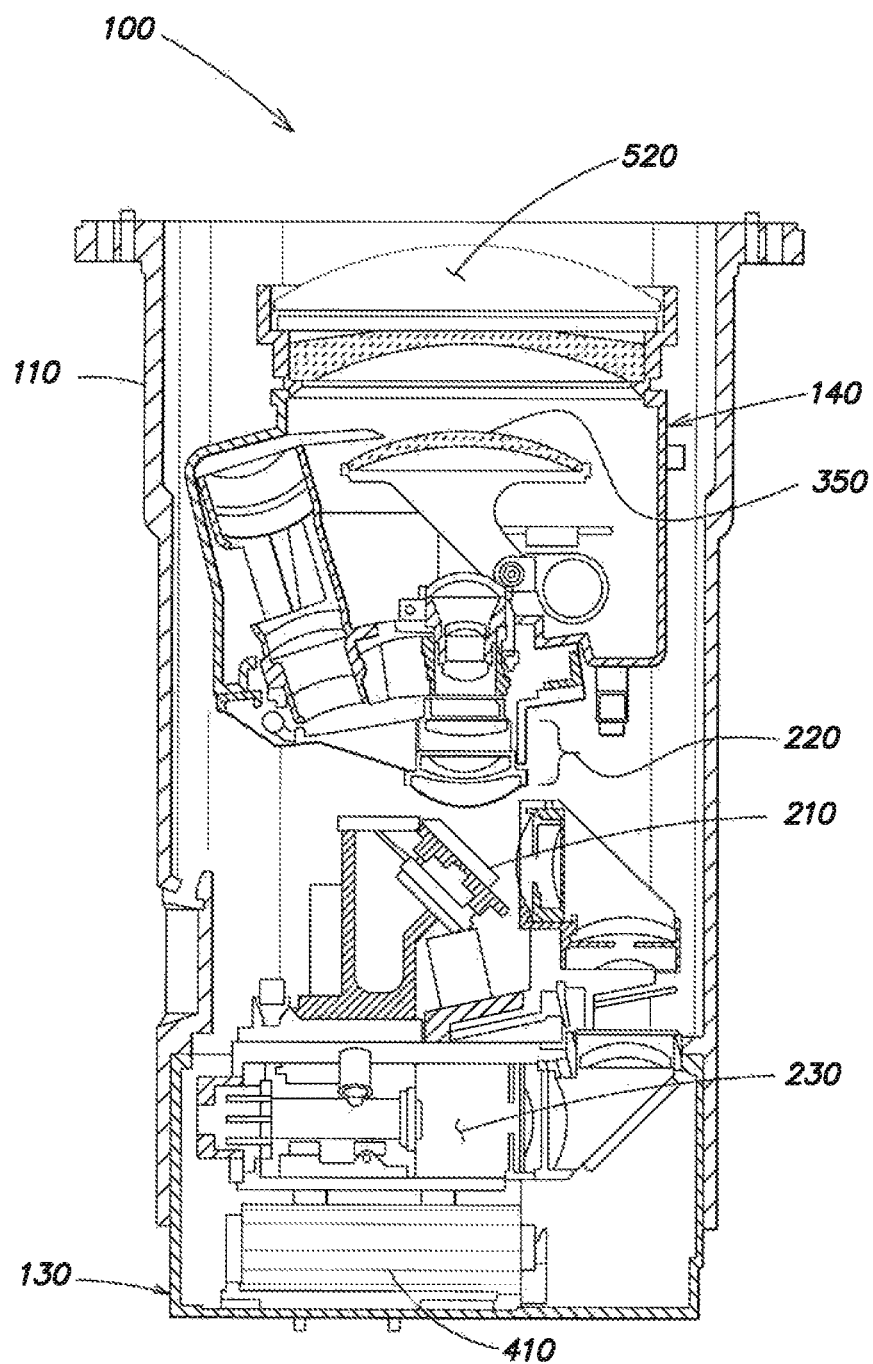
FIG. 2 is a diagram of one example of the sight chassis assembly of FIG. 1 shown assembled and including a FLIR B-kit according to aspects of the invention.

FIG. 2 illustrates an example of an assembled FLIR B-kit according to one embodiment, including the afocal optical assembly 140 and receiver assembly 130 assembled within the sight chassis 110.

Referring again to FIG. 5A, as discussed above, the B-kit 500 includes one or more circuit card assemblies 122, 124, and/or 126. In one embodiment, circuit card assemblies 124 and/or 126 provide control and status communication, as well as video data transfer between the components of the B-kit 500 and the A-kit 510. As illustrated in FIG. 5A, the B-kit may further include a power filter and conditioner 560 that receives power from the A-kit 510 and supplies power to components of B-kit 500, as necessary, optionally via flexible circuit assemblies 153 and 154, to the circuit card assembly 122 and/or circuit card assemblies 124 and/or 126.

In one embodiment, the receiver assembly 130 includes an image motion compensation (IMC) mirror 210 that directs light from the focus cell 220 of the afocal optical assembly 140 through the optical imager 540 to the detector 550 located within the Dewar 230. The IMC mirror 210 may be used to reduce jitter and improve image stabilization. In one example, at least one of the circuit card assemblies 122, 124, and/or 126 included in the FLIR B-kit 500 includes an image motion compensation controller that is configured to compensate for error in the movement of the head mirror measured using a gyroscope, as discussed above. In certain examples, the head mirror in the head mirror assembly 190 may be relatively large and/or heavy, and accordingly, may be limited in fine motion. Therefore, the image motion compensation controller may adjust positioning of the IMC mirror 210 based on measurements from the gyroscope to compensate for jitter and improve image stabilization and reduce blur. In addition, the IMC mirror 210 may be used to provide "backscan" which temporarily counteracts line-of-sight motion to "freeze" an image during image collection before stepping to the next image location, thereby allowing rapid wide area searching.

As discussed above, the afocal optical assembly is configured with multiple different selectable fields of view. Referring to FIGS. 3A-3F, in one embodiment, the afocal optical assembly 140 includes multiple FOV cells arranged on the rotatable turret 310. By rotating the turret 310, any one of the FOV cells may be aligned with the focus cell 220 thereby achieving a selected field of view for the sight. In some examples, the rotatable turret 310 is referred to as a rotating FOV wheel. In one embodiment, the afocal optical assembly has four selectable fields of view, namely an ultranarrow field of view (UNFOV), a narrow field of view (NFOV), a wide field of view (WFOV), and an ultrawide field of view (UWFOV). Other embodiments replace the UWFOV with a medium field of view (MFOV), or implement optics that support five fields of view (for example, UNFOV, NFOV, MFOV, WFOV, and UWFOV), as discussed further below.

In one embodiment, the afocal optical assembly 140 includes a WFOV cell 330, a UWFOV cell 320, and a UNFOV cell 340. In one example the optical system has a field of view of approximately 1.24 degrees horizontal by 0.7 degrees vertical in the UNFOV configuration (i.e., with the UNFOV cell 340 aligned with the focus cell 220). In another example, the optical system has a field of view of approximately 13.3 degrees horizontal by 7.5 degrees vertical in the WFOV configuration. In another example, the optical system has a field of view of approximately 21.9 degrees horizontal by 12.3 degrees vertical in the UWFOV configuration. In some examples the optical system may have a field of view of approximately 3.56 degrees horizontal by 2.0 degrees vertical in the NFOV configuration, and a field of view of approximately 7.1 degrees horizontal by 4 degrees vertical in the MFOV configuration.

Figure 3A:
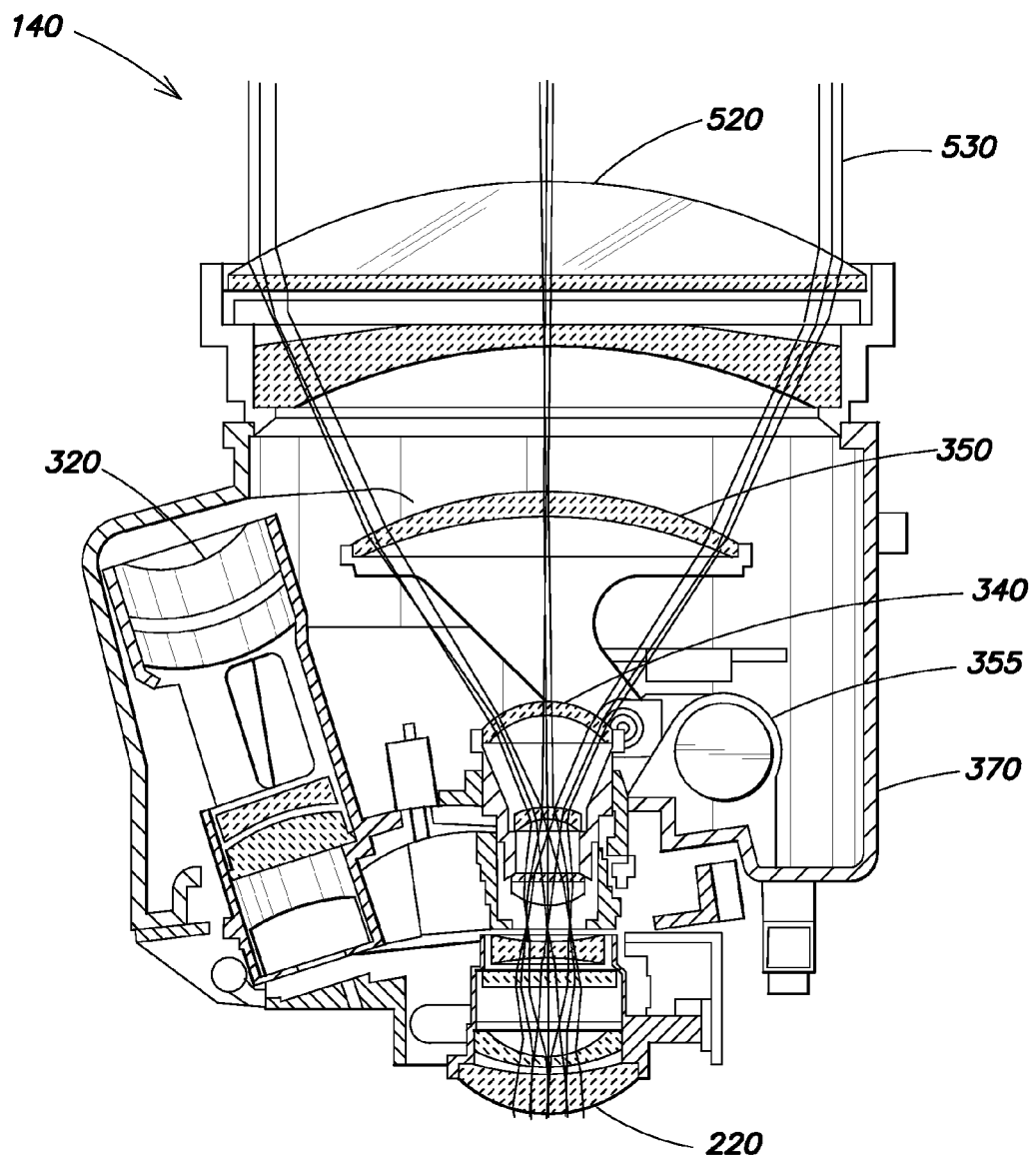
FIG. 3A is a cut-away view of one example of an afocal optical assembly for a FLIR B-kit module according to aspects of the invention.
Figure 3B:
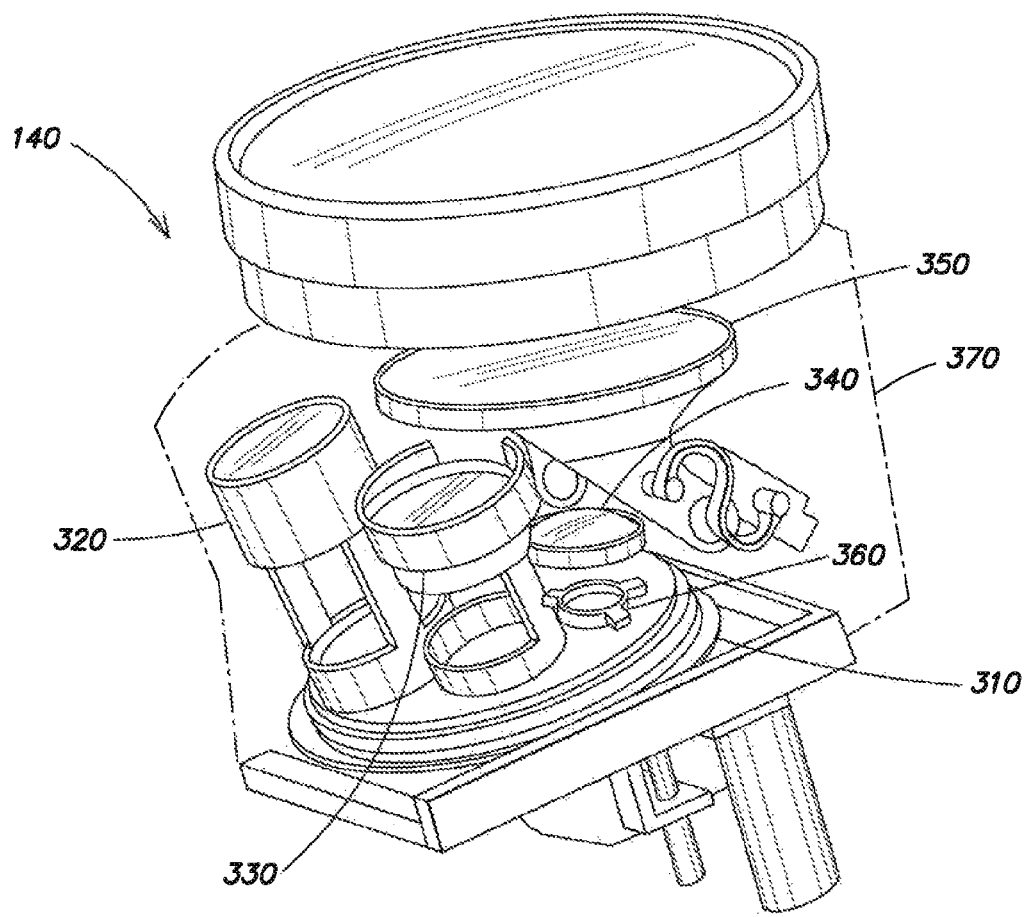
FIG. 3B is another view of the afocal optical assembly of FIG. 3A.
Figure 3C:
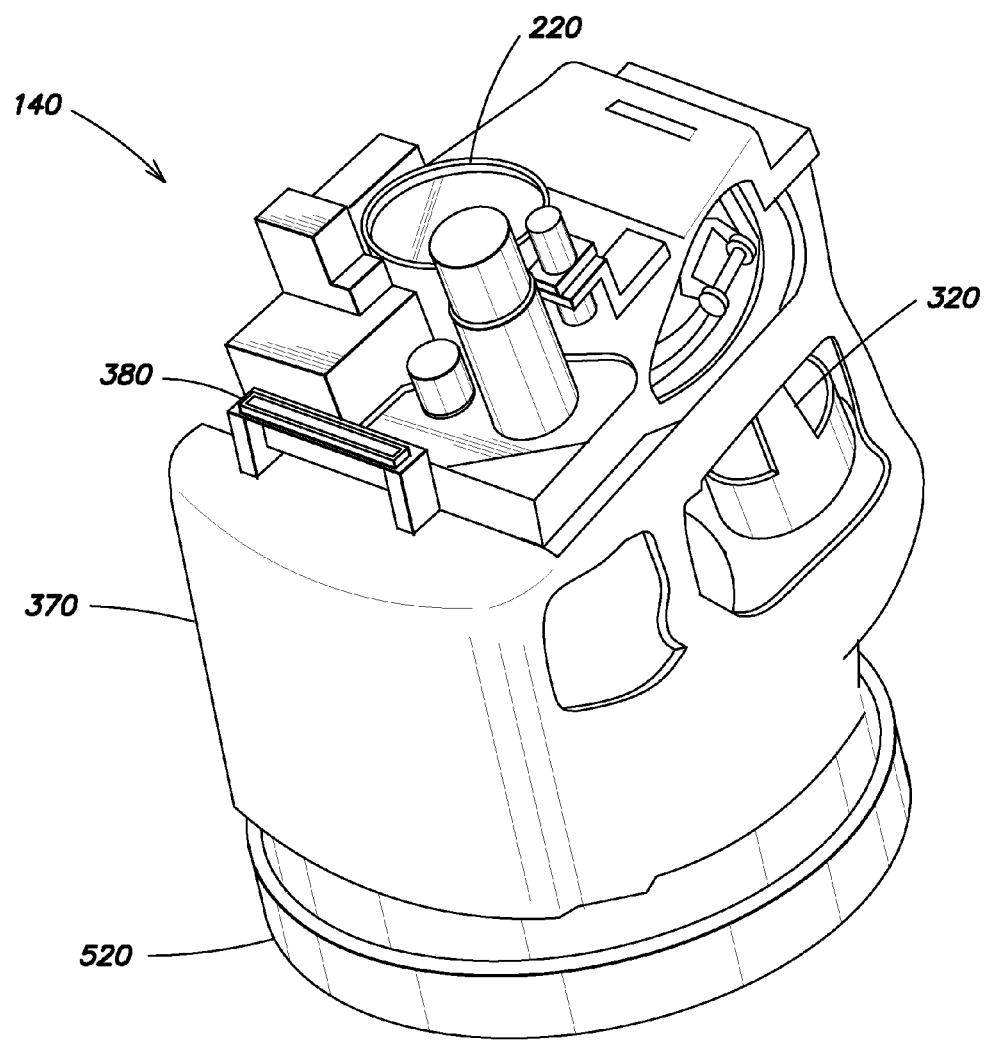
FIG. 3C is another view of the afocal optical assembly of FIGS. 3A and 3B, showing the underside of the assembly according to aspects of the invention.

In one example, the optical parameters and design of the afocal optical assembly 140 uses the NFOV configuration as the basis for the optical design. Accordingly, in one example, the FOV wheel has an opening and does not include any lenses, so that the objective lenses 520, focus lens cell, and "downstream" optical components define the NFOV. In some embodiments, a flip lens 350 may be used for the UNFOV configuration. As illustrated in FIGS. 3A and 3B, in one embodiment, the flip lens 350 may be configured to be movable into and out of the optical path over the UNFOV cell 340. FIGS. 3A and 3B show the lens 350 flipped into the optical path. In each of these configurations, the rotating FOV wheel 310 is positioned such that the UNFOV cell 340 is aligned over the focus cell 220 or "eyepiece" of the afocal optical assembly 140. An actuator assembly 355 may be used to effect the movement of the flip lens 350. Thus, to achieve UNFOV operation, the UNFOV cell and the flip lens 350 are positioned in the NFOV optical path, aligned with the focus cell 220.

Figure 3D:
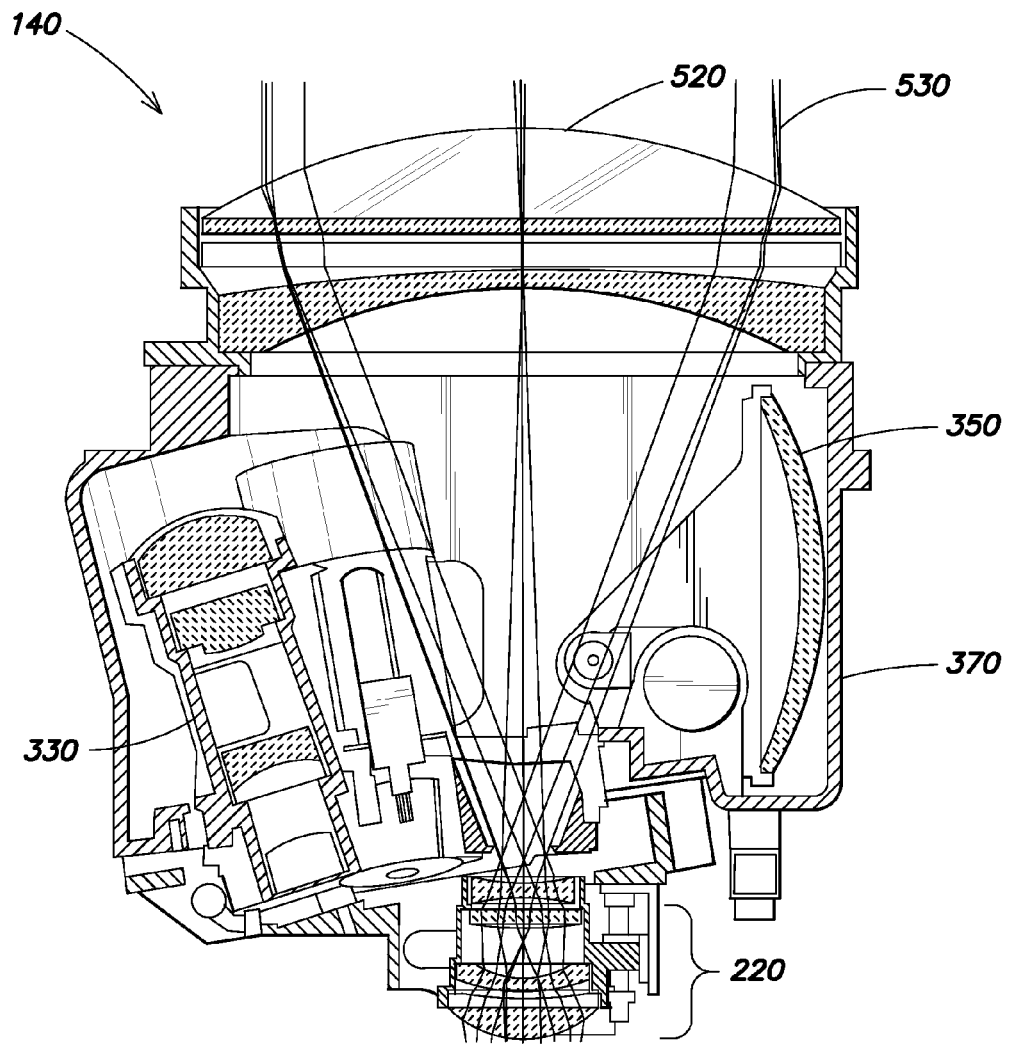
FIG. 3D is an illustration of one example of an NFOV configuration of the afocal optical assembly of FIG. 3A according to aspects of the invention.
Figure 3E:
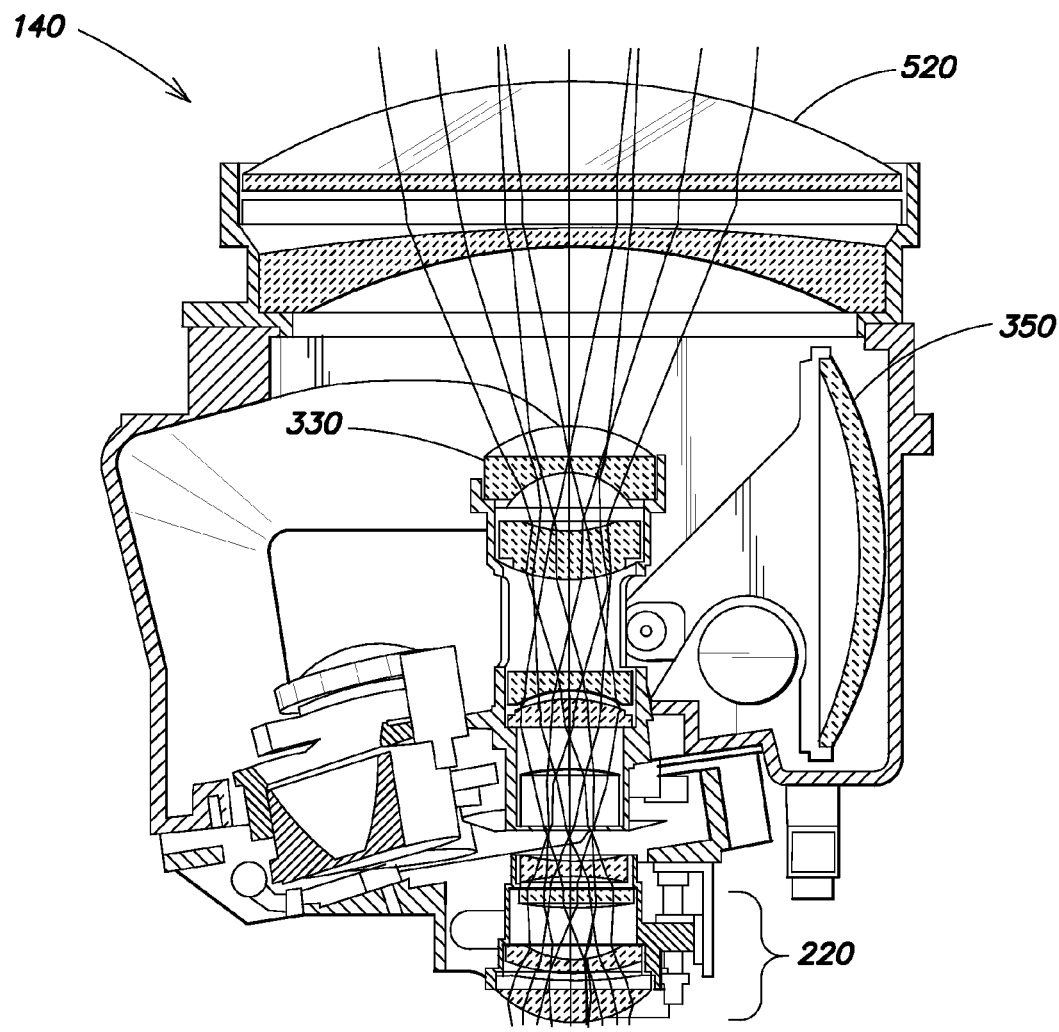
FIG. 3E is an illustration of one example of a WFOV configuration of the afocal optical assembly of FIG. 3A according to aspects of the invention.
Figure 3F:
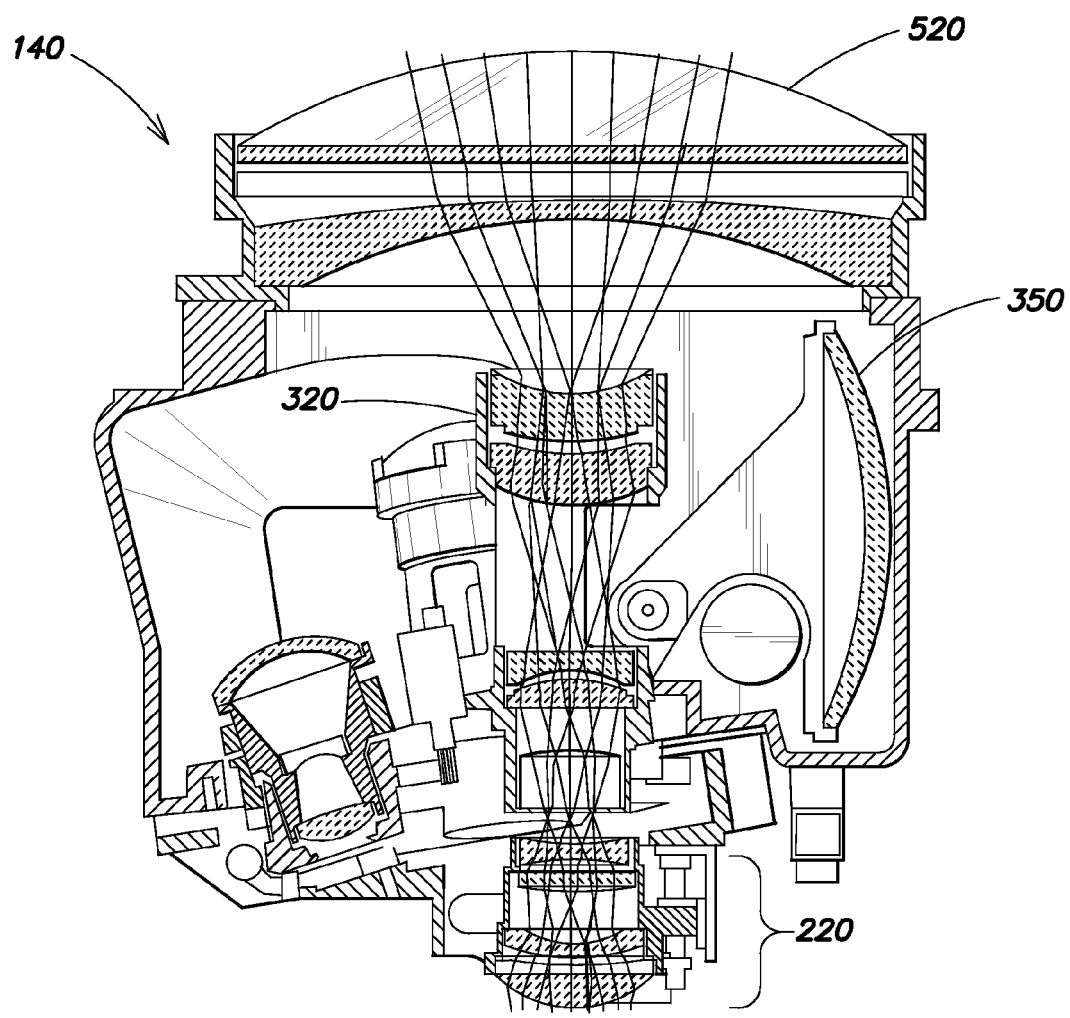
FIG. 3F is an illustration of one example of an UWFOV configuration of the afocal optical assembly of FIG. 3A according to aspects of the invention.

FIGS. 3D-3F illustrate configurations of the afocal optical assembly 140 for different fields of view. FIG. 3D illustrates an example of the NFOV configuration, in which the flip lens 350 is positioned out of the optical path, and an "empty" slot on the structure 310 is positioned over the focus cell 220 since, as discussed above, in this example the NFOV configuration forms the basis for the optical design. FIG. 3E illustrates an example of the WFOV configuration in which the flip lens 350 is positioned out of the optical path, and the structure 310 is rotated such that the WFOV cell 330 is positioned in the optical path aligned with the focus cell 220. FIG. 3F illustrates an example of the UWFOV configuration in which the flip lens 350 is positioned out of the optical path, and the structure 310 is rotated such that the UWFOV cell 320 is positioned in the optical path aligned with the focus cell 220.

In one embodiment, the afocal optical assembly 140 is a fully refractive optical system (optionally excluding planar fold mirrors as discussed further below) to provide a compact optical assembly which may be accommodated within the space allocated to legacy optical assemblies in existing systems. In other embodiments the afocal assembly utilizes a combination of reflective and refractive lenses which, while may not be easily packaged into some A-Kits, may be more optimal for others.

According to one embodiment, the afocal optical assembly 140 may also include a thermal reference source 360 positioned on the rotating FOV wheel 310. The thermal reference source 360 may be configured to produce infrared radiation having known characteristics (e.g., predetermined spectral characteristics and intensity). For thermal calibration of the afocal optical assembly 140, and/or other components of the sight assembly, the thermal reference source 360 may be rotated into alignment with the focus cell 220 such that the known radiation is supplied to the detector in the receiver assembly 130. Measurements from the detector of the thermal reference source 360 may be used to calibrate the sensor.

In one example, the thermal reference source (TRS) 360 includes a thermal electric cooler (TEC) and optics to produce a uniform image which may be used for non-uniformity correction. Including the thermal reference source 360 on the rotary turret 310 removes the need for a separate mechanism to insert the thermal reference source. When inserted and active, the thermal reference source 360 provides a uniform thermal image that is imaged onto all of the detector elements of the detector 550. When viewing a uniform image the output of all detectors should be the same. Non-uniformity correction measures the differences in detector outputs for at least two different thermal electric cooler temperatures to generate coefficients that are used to electronically adjust the video from each detector element such that when viewing the same intensity within an image each detector element provides the same output.

In one embodiment when the thermal reference source is placed over the focus cell 220 it acts as a shutter, blocking external electro-magnetic radiation from reaching the detector 550, thereby protecting the detector and the smaller focus and imager lenses from damage.

In one embodiment, the afocal optical assembly is configured for mid-wave infrared (MWIR) and long-wave infrared (LWIR) imaging. Accordingly, all lenses are designed having materials and parameters suitable for transmission of electromagnetic radiation in the MWIR and LWIR spectral bands. For example, the optics may be configured for transmission over a wavelength range of approximately 3-5 µm and 8-12 µm. Some example materials which may be used to produce optical components, such as lenses, operable over at least a portion of these wavelength ranges may include Gallium Arsenide (GaAs), Barium Fluoride ($BaF_2$), Zinc Selenide (ZnSe), Zinc Sulfide (ZnS), and Germanium (Ge), among others. Chalcogenide materials (germanium, selenium, arsenic compounds) may also be used if not prohibited.

Still referring to FIGS. 3A-F, components of the afocal optical assembly 140 may be accommodated within a housing 370 configured to fit within and be mounted within the chassis 110 discussed above. A connector 380 may be provided to connect components, such as the actuator assembly 355 for the flip mirror 350, and actuator for the rotating FOV wheel 310, or the thermal reference source 360 to one or more of the circuit card assemblies 122, 124 and 126 to allow electronic control of these components.

As discussed above, according to certain embodiments, the sight assembly further includes the receiver assembly 130. An example of the receiver assembly 130 is illustrated in more detail in FIGS. 4A-4D. In one embodiment, the receiver assembly 130 includes a cooled imaging detector 550 packaged in the Dewar 230. In one example, the imaging detector 550 is a two-dimensional (2D) array detector, such as a 2D focal plane array. In contrast, the Second Generation FLIR B-kits include only a one-dimensional detector array. The detector Dewar 230 includes a window 415 that allows electromagnetic radiation into the Dewar to reach the detector array 550. A cryogenic cooler 410 may provide the cooling of the Dewar 230. Cold shielding of the detector array 550 within the Dewar 230 provided by the variable aperture mechanism is advantageous in that it blocks stray "light" from hitting the detector, reducing noise which otherwise can greatly reduce the sensitivity (and therefore range) of a thermal imaging detector. A cooler control module 425 may control operation of the cooler 410, such as the temperature to which the Dewar 230 is cooled, for example. The cooler control module 425 may be coupled to one or more of the circuit card assemblies 122, 124, 126 discussed above to interface with the various other electronic control systems of the sight assembly.

Figure 4A:
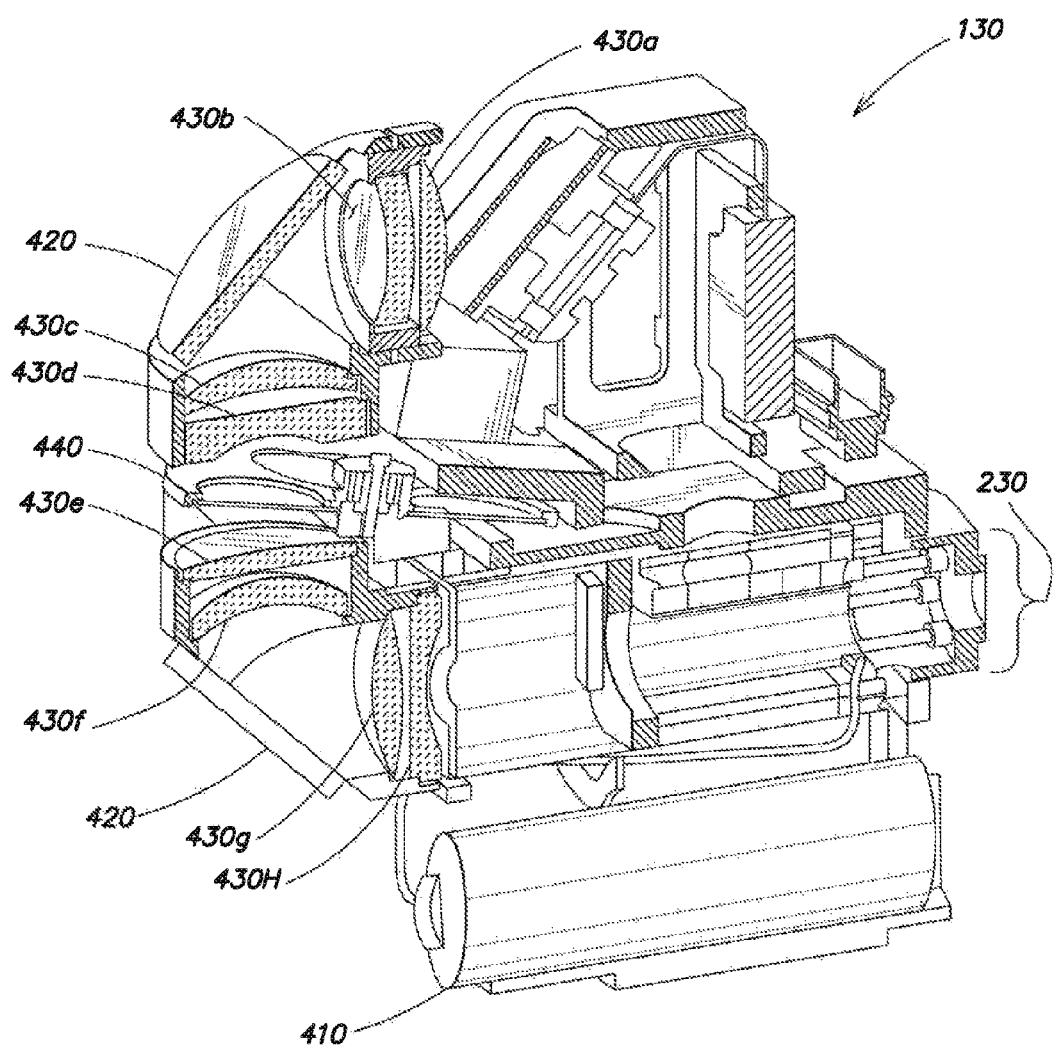
FIG. 4A is a diagram of one example of a receiver assembly with the housing removed for clarity according to aspects of the invention.
Figure 4B:
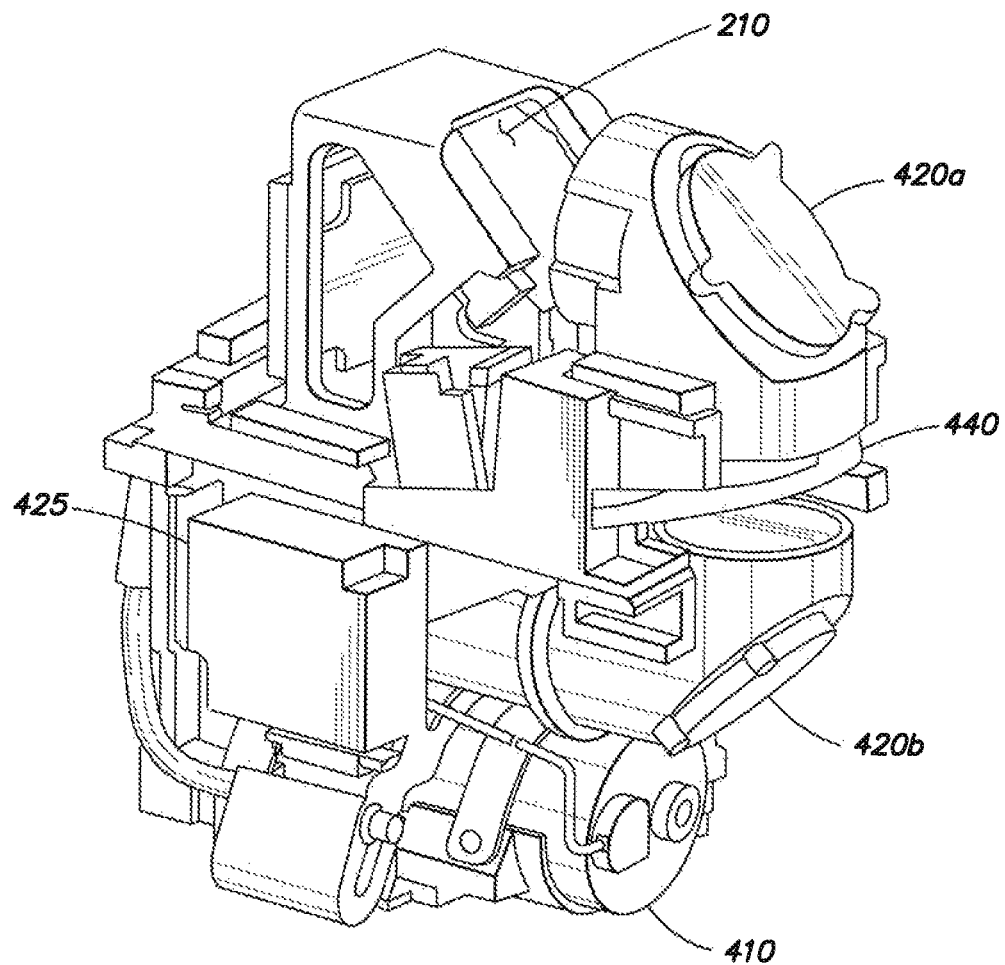
FIG. 4B is a side view of an example of the receiver assembly of FIG. 4A according to aspects of the invention.
Figure 4C:
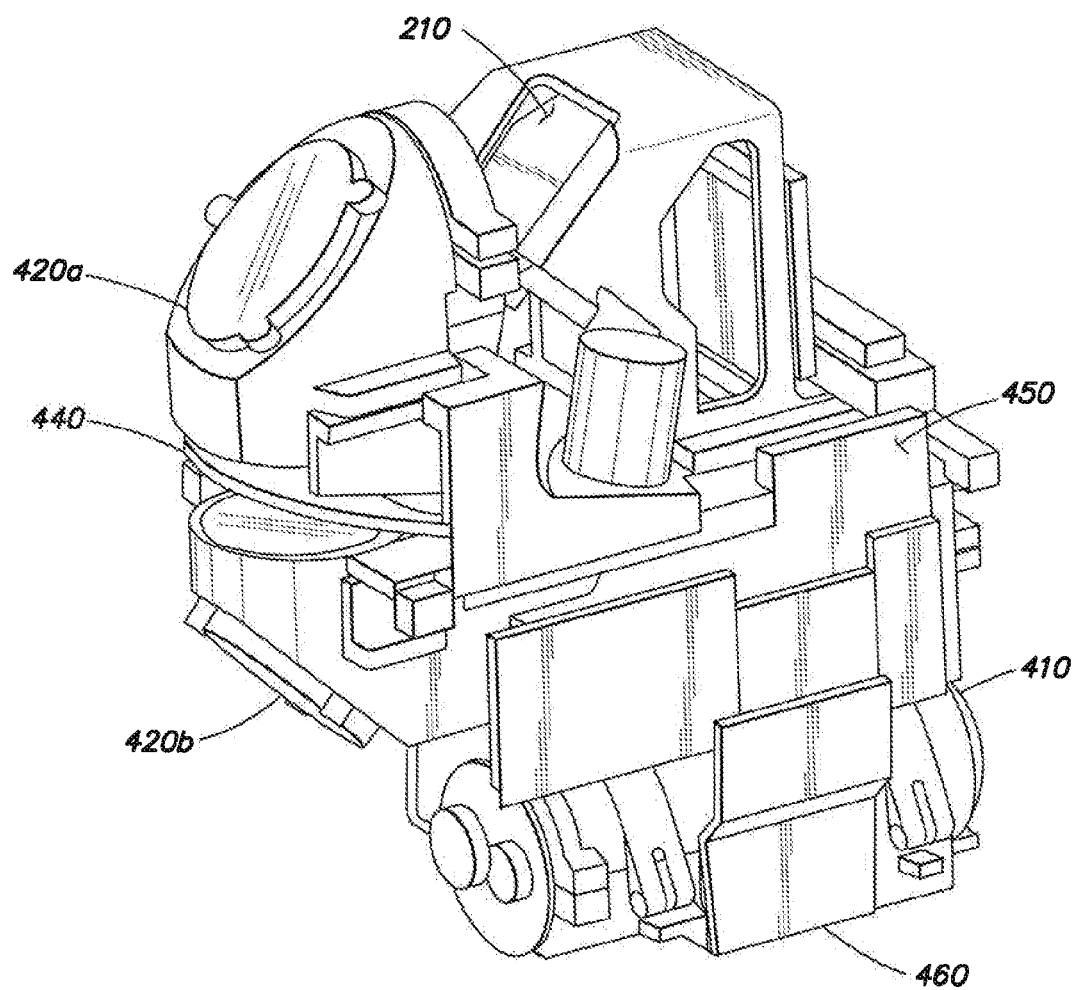
FIG. 4C is another side view of an example of the receiver assembly of FIGS. 4A and 4B according to aspects of the invention.
Figure 4D:
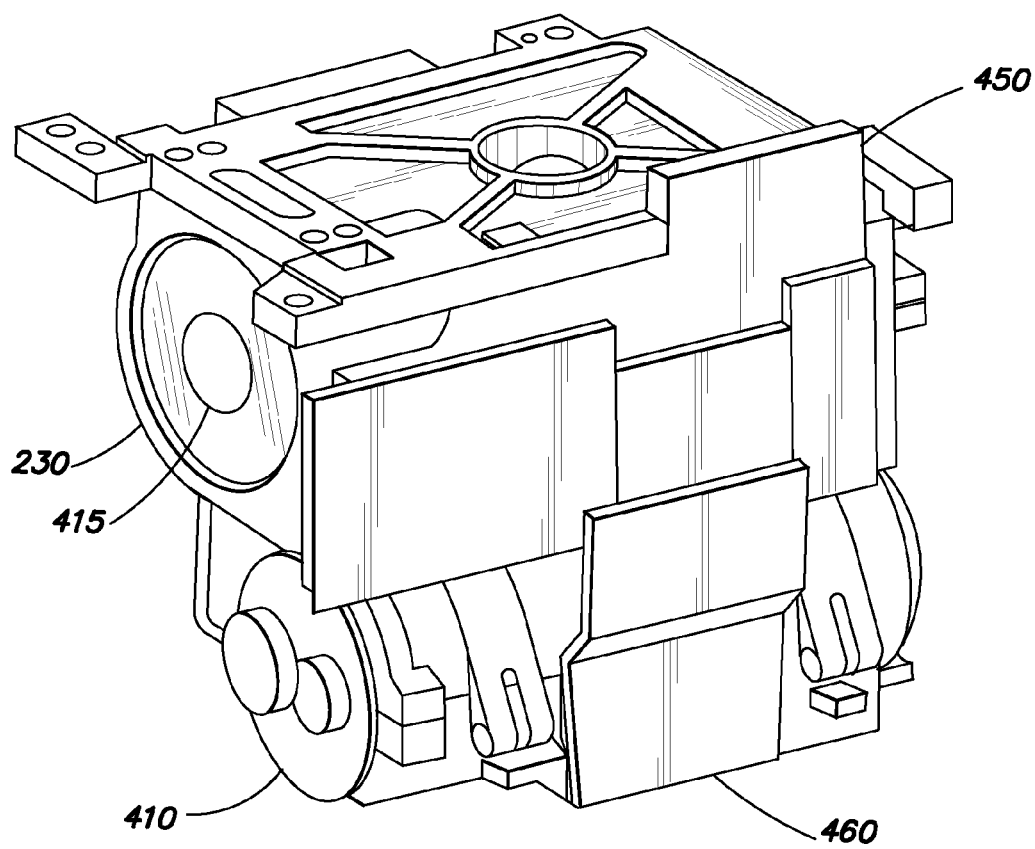
FIG. 4D is a diagram of a portion of the receiver assembly of FIGS. 4A-4C according to aspects of the invention.

Referring to FIGS. 4C, 4D and 5A, the receiver assembly 130 may include interface electronics 450. The interface electronics 450 may be coupled to, one or more of the circuit card assemblies 122, 124, 126 discussed above. In one embodiment a heat transfer strap 460 is connector between the interface electronics 450 and the receiver base to transfer heat away from the electronics.

In one embodiment, the Dewar 230 includes a variable aperture mechanism (VAM) packaged within the Dewar 230 that provides an "f-stop" for the optics. In one example, this variable aperture mechanism has two or more positions that set the f/# for the optical system. In one example, the detector Dewar includes a dual f/# variable aperture mechanism that provides low f/# (for example, about f/2.0 or f/2.5) full LWIR performance in the NFOV, WFOV, MFOV and UWFOV configurations, while also providing a higher f/# (for example, between about f/4.0 and f/6.0; in one example, f/5.06) for the long effective focal length (EFL) UNFOV configuration to increase the range of the sight. In one example, the NFOV and WFOV have the same dimensions as the Second Generation FLIR B-Kit NFOV and WFOV but provide performance that exceeds that of a comparable Second Generation FLIR B-kit optical module under substantially all operating conditions.

Referring again to FIGS. 4A and 5A, the optical imager 540 of the receiver assembly 130 may include a configuration of mirrors and lenses to direct the incoming electromagnetic radiation from the focus cell 220 of the afocal optical assembly 140 into the Dewar 230. These mirrors and lenses may be selected and arranged to achieve a compact form factor for the receiver assembly 130. In the example illustrated in FIG. 4A, the imager 540 includes a pair of fold mirrors 420 and a set of eight lenses 430a-h. The lenses may be configured and grouped, for example, in pairs with a positive-power and negative-power or zero-power lens in each pair as shown in FIG. 4A, to achieve color correction over a wide spectral band, such as from approximately 3-5 µm and 7.6-10 µm, for example.

In one embodiment, the receiver assembly includes a filter wheel 440 positioned between the lenses 430d and 430e, as shown in FIG. 4A. It will be appreciated that although the filter wheel 440 is illustrated positioned between lenses 430d and 430e, in other embodiments the filter wheel may be located in a different position in the optical path between the focus cell 220 and the detector 550.

Figure 5B:
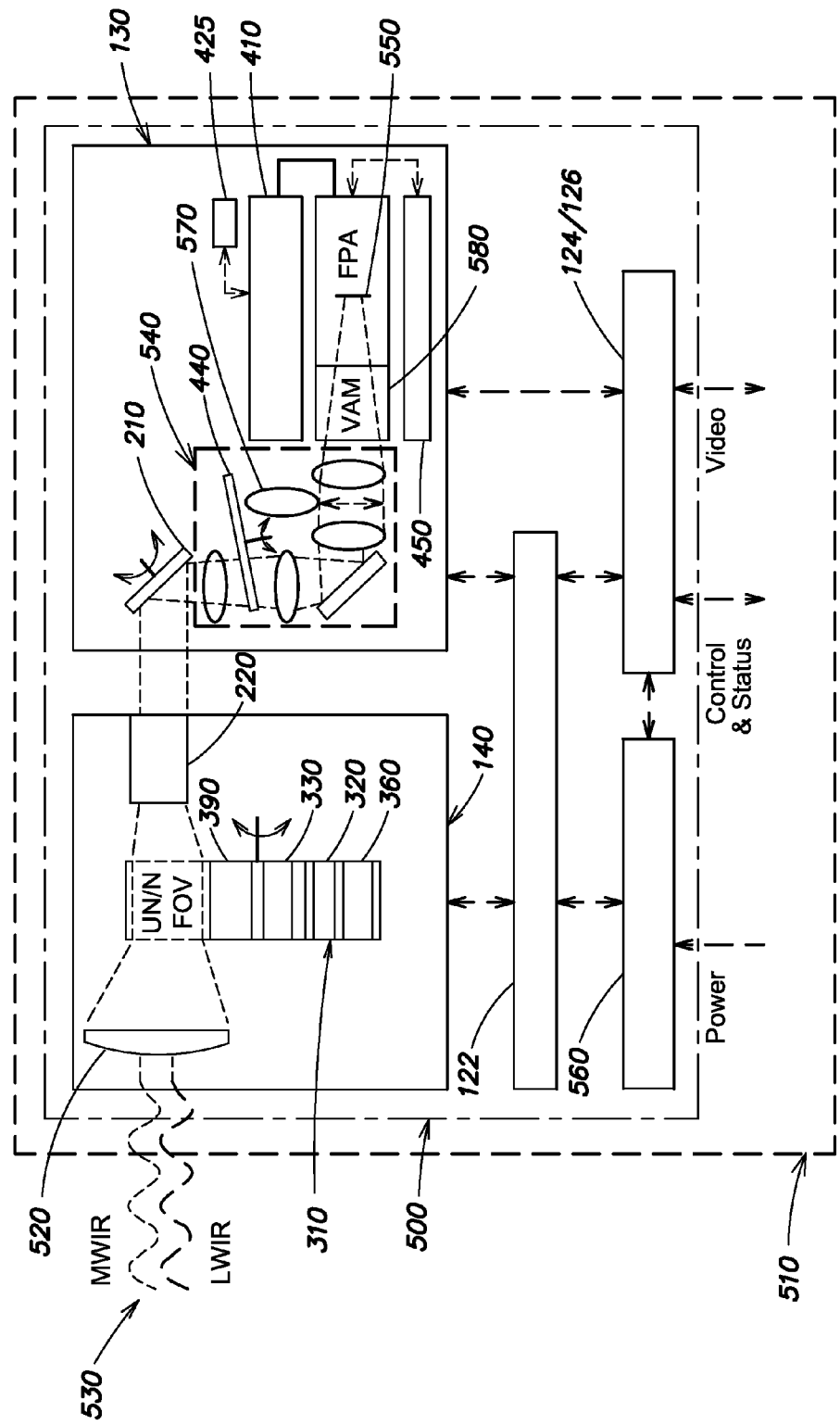
FIG. 5B is a block diagram of another example of an optical system according to aspects of the invention.

As discussed above, the afocal optical assembly may be configured to provide a number of different fields of view. In one embodiment, as discussed with reference to FIGS. 3A-3F, the afocal optical assembly includes the UWFOV cell 320, WFOV cell 330, and UNFOV cell 340. Referring to FIG. 5B, in another embodiment, the UNFOV cell 340 is replaced with a MFOV cell 390. In this embodiment, the optical imager 540 of the receiver assembly 130 may include a FOV mechanism 570 to provide additional fields of view, such as for a 5 FOV sensor. For example, the FOV mechanism may include one or more lenses or other optical components that may be movable into or out of the optical path between the focus cell 220 and the detector 550 to change the field of the view of the system, for example, between a narrow field of view and an ultranarrow field of view. In one example of this embodiment, the flip lens 350 is eliminated. This configuration may be advantageous in that it may provide improved boresight retention and/or reduced UNFOV switch time, along with reduced size, weight and power (SWAP) characteristics for the sight.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An infrared imaging sensor compatible with upgrade of second generation forward looking infrared (FLIR) B-kits, comprising:
    a set of refractive opto-mechanical modules configured to receive and create video from infrared electromagnetic radiation in at least the mid-wave infrared (MWIR) and long-wave infrared (LWIR) spectral bands, the set of refractive opto-mechanical modules including an afocal optical module having an eyepiece and configured to provide a plurality of fields of view for the infrared imaging sensor;
    a receiver assembly including a detector in a Dewar optically coupled to the eyepiece and configured to receive the infrared electromagnetic radiation from the eyepiece and to generate an electronic image from the infrared electromagnetic radiation, the receiver further including an imager configured to direct the infrared electromagnetic radiation from the afocal optical module to the detector in the Dewar; and
    at least one electronics module configured to provide an electronic interface for the infrared imaging sensor, and to process the electronic image.

2. The infrared imaging sensor of claim 1, wherein the afocal optical module is configured to provide at least four fields of view.

3. The infrared imaging sensor of claim 2, wherein the at least four fields of view include an ultranarrow field of view, a narrow field of view, a wide field of view, and an ultrawide field of view.

4. The infrared imaging sensor of claim 3, wherein the at least four fields of view includes five fields of view, further including a medium field of view.

5. The infrared imaging sensor of claim 4, wherein the receiver assembly includes a FOV mechanism configured to switch the field of view of the sensor between the ultranarrow field of view and the narrow field of view without changing a position of the afocal optical module.

6. The infrared imaging sensor of claim 2, wherein the at least four fields of view include an ultranarrow field of view, a narrow field of view, a medium field of view, and a wide field of view.

7. The infrared imaging sensor of claim 1, wherein the afocal optical module is configured to receive and magnify the electromagnetic radiation in the MWIR and LWIR spectral bands and to output magnified electromagnetic radiation via a focus cell.

8. The infrared imaging sensor of claim 7, wherein the afocal optical module comprises a plurality of field of view (FOV) cells, each configured to provide one of the plurality of fields of view, the plurality of FOV cells being disposed on a rotating structure that is configured to rotate with respect to the focus cell so as to align one of the plurality of FOV cells with the focus cell.

9. The infrared imaging sensor of claim 8, further comprising a thermal reference source disposed on the rotating structure.

10. The infrared imaging sensor of claim 9, wherein the thermal reference source is configured to be moved into an optical path of the focus cell and to provide a shutter mechanism for the sensor.

11. The infrared imaging sensor of claim 8, wherein the afocal optical module further comprises a movable lens that is movable into and out of an optical path between an input aperture of the afocal optical module and at least one of the plurality of FOV cells.

12. The infrared imaging sensor of claim 1, wherein the eyepiece is a focus cell for the sensor.

13. The infrared imaging sensor of claim 1, wherein the Dewar includes a dual f/# variable aperture mechanism configured to provide a first f/# for at least a first one of the plurality of fields of view, and a second f/# for at least a second one of the plurality of fields of view.

14. The infrared imaging sensor of claim 1, wherein the receiver assembly further includes an image motion compensation mirror.

15. The infrared imaging sensor of claim 14, wherein the image motion compensation mirror is configured for back-scan imaging.

16. The infrared imaging system of claim 1, wherein the detector is a two-dimensional focal plane array.

17. An infrared imaging sensor comprising:
   an afocal optical assembly including an input aperture configured to receive infrared electromagnetic radiation from a distant object, a focus cell, a plurality of field of view (FOV) cells disposed on a rotating structure configured to rotate with respect to the focus cell so as to align one of the plurality of FOV cells with the focus cell, wherein each of the FOV cells has a different field of view, and the plurality of FOV cells includes an ultranarrow FOV cell, a wide FOV cell, and an ultrawide FOV cell;
   a receiver assembly including a detector optically coupled to the focus cell and configured to receive the infrared electromagnetic radiation from the focus cell and to provide an image of the distant object; and
   at least one electronics module configured to interface the infrared imaging sensor with other sensor modules and to process the image of the distant object.

18. The infrared imaging system of claim 17, wherein the afocal optical assembly further includes a movable lens configured to be movable into and out of an optical path between the input aperture and at least one of the FOV cells.

19. The infrared imaging sensor of claim 17, wherein the plurality of FOV cells further includes a medium FOV cell; and
   wherein the receiver assembly further includes a FOV mechanism configured to switch the field of view of the sensor between an ultranarrow field of view and a narrow field of view.

20. An infrared imaging sensor compatible with upgrade of second generation forward looking infrared (FLIR) B-kits, comprising:
   a set of refractive opto-mechanical modules configured to receive and create video from infrared electromagnetic radiation in at least the mid-wave infrared (MWIR) and long-wave infrared (LWIR) spectral bands, the set of refractive opto-mechanical modules including a focus cell and an afocal optical module configured to receive and magnify the electromagnetic radiation in the MWIR and LWIR spectral bands and to output magnified electromagnetic radiation via the focus cell, the afocal optical module including a plurality of field of view (FOV) cells, each configured to one of a plurality of fields of view for the infrared imaging sensor, the plurality of FOV cells being disposed on a rotating structure that is configured to rotate with respect to the focus cell so as to align one of the plurality of FOV cells with the focus cell;
   a receiver assembly including a detector in a Dewar optically coupled to the focus cell and configured to receive the infrared electromagnetic radiation from the focus cell and to generate an electronic image from the infrared electromagnetic radiation; and
   at least one electronics module configured to provide an electronic interface for the infrared imaging sensor, and to process the electronic image.

21. The infrared imaging sensor of claim 20, further comprising a thermal reference source disposed on the rotating structure, the thermal reference source being configured to be moved into an optical path of the focus cell and to provide a shutter mechanism for the sensor.

* * * * *